(12) United States Patent
Sugimura (10) Patent No.: US 6,929,581 B2
(45) Date of Patent: Aug. 16, 2005

(54) DOWNSHIFTING TIME TORQUE-DOWN CONTROL DEVICE AND METHOD

(75) Inventor: Toshio Sugimura, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 106 days.

(21) Appl. No.: 10/656,107

(22) Filed: Sep. 8, 2003

(65) Prior Publication Data

US 2004/0053744 A1 Mar. 18, 2004

(30) Foreign Application Priority Data

Sep. 13, 2002 (JP) ........................................ 2002-268405

(51) Int. Cl.$^7$ .............................................. F16H 59/74
(52) U.S. Cl. ....................................... 477/102; 477/109
(58) Field of Search ................................ 477/102, 109; 701/54, 60

(56) References Cited

U.S. PATENT DOCUMENTS 5,188,005 A * 2/1993 Sankpal et al. ............. 477/102
6,024,669 A * 2/2000 Iwatsuki et al. ............. 477/107
6,687,591 B2 * 2/2004 Abe ............................ 701/54

FOREIGN PATENT DOCUMENTS

JP    5-43528    7/1993

* cited by examiner

Primary Examiner—Dirk Wright
(74) Attorney, Agent, or Firm—Oblon, Spivak, McClelland, Maier & Neustadt, P.C.

(57) ABSTRACT

In a torque-down control device, an entire delay amount SB of ignition timing is restricted using a guard value GSB. Also, when a rotational speed change ΔNT of a turbine speed NT during delay control falls out of an allowable range, the feedback control of the entire delay amount SB is performed based on the rotational speed change ΔNT is equal to a target rotational speed change ΔNTT. Accordingly, an excessive decrease in engine torque even when downshifting is performed simultaneously with delay control by a knock control portion. Further, the feedback control of the entire delay amount SB is performed based on the rotational speed change ΔNT, and the guard value GSB is learned and corrected based on the feedback correction amount. Accordingly, an appropriate shifting characteristic can be obtained regardless of individual differences and change with time.

14 Claims, 9 Drawing Sheets

| POSITION | | CLUTCH & BRAKE | | | | | | O.W.C. | |
|---|---|---|---|---|---|---|---|---|---|
| | | C1 | C2 | C3 | B1 | B2 | B3 | F1 | F2 |
| N,P | | X | X | X | X | X | O | X | X |
| R | | X | O | X | X | O | O | X | X |
| D | 1st | O | X | X | X | X | O | O | △ |
| | 2nd | O | X | X | O | X | O | X | △ |
| | 3rd | O | O | X | X | X | O | X | △ |
| | 4th | O | O | O | X | X | X | X | X |
| 2 | 1st | O | X | X | X | O | O | △ | △ |
| | 2nd | O | X | X | O | X | O | X | △ |
| L | 1st | O | X | X | X | O | O | △ | △ |

DOWNSHIFTING TIME TORQUE-DOWN CONTROL DEVICE AND METHOD

INCORPORATION BY REFERENCE

The disclosure of Japanese Patent Application No. 2002-268405 filed on Sep. 13, 2002 including the specification, drawings and abstract is incorporated herein by reference in its entirety.

BACKGROUND OF THE INVENTION

1. Field of the Invention

The invention relates to downshifting time torque-down control device and method. More particularly, the invention relates to art for preventing engine torque from excessively decreasing due to, for example, simultaneous execution of downshifting and delay control for a knocking control measure.

2. Description of the Related Art

During downshifting of a transmission, when an input rotational speed increases and reaches a synchronous rotational speed, if a large input torque is applied to the transmission, for example, abnormal noise or shift shock may occur due to abrupt engagement of a one-way clutch related to shifting, and durability of a frictional engagement device may be impaired. In order to prevent these problems, it is suggested that engine torque be temporarily decreased before the input rotational speed reaches the synchronous rotational speed, for example, as disclosed in Japanese Patent Publication No. 5-43528.

A decrease in the engine torque may be realized by delay control of ignition timing. The delay control of ignition timing is also employed in an engine knocking control measure. For example, when normal fuel is used for an engine designed for high-octane gasoline, knocking is likely to occur. Accordingly, the ignition timing constantly moves to a delay side by a knock control system or the like. Therefore, in the case where the ignition timing moves to the delay side, when delay control is further performed in order to decrease torque during downshifting, a possibility arises where the engine torque excessively decreases and a shifting characteristic is impaired, and consequently torque shock occurs due to abrupt engagement of the one-way clutch and torque fluctuation, and acceleration performance is impaired.

Figure 9:
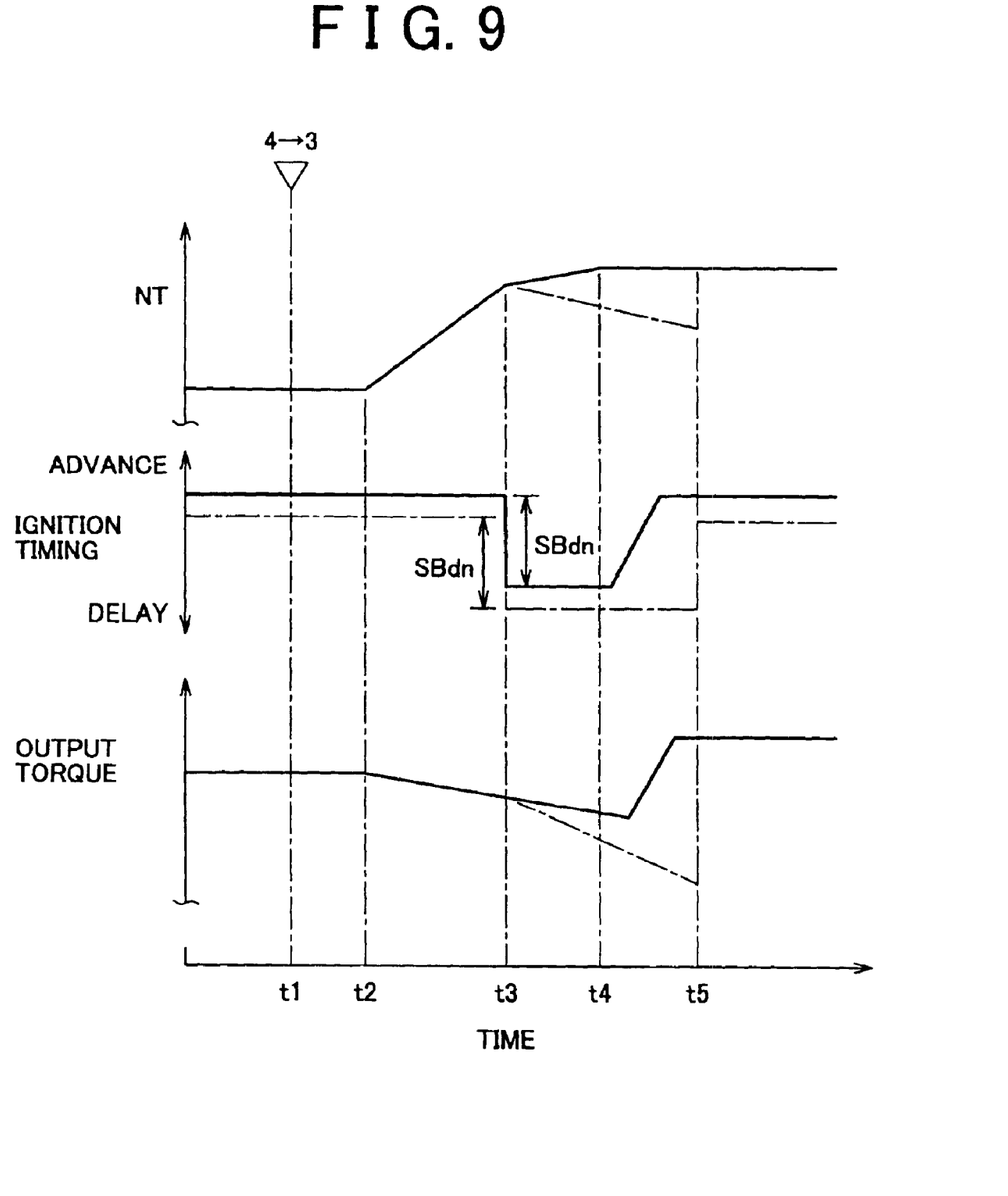
FIG. 9 is an example of a time chart when conventional downshifting time delay control is performed during delay control performed by the knock control portion.

For example, FIG. 9 is a time chart showing changes in a turbine speed (an input rotational speed) NT during downshifting from fourth speed to third speed, an ignition timing, and output torque. A solid line shows a case of downshifting during normal engine torque control in which the knocking control measure is not taken. When delay control is performed for delaying the ignition timing by a delay amount $SB_{dn}$ with respect to time $T_3$, the turbine speed NT reaches the synchronous rotational speed smoothly (time $t_4$), and the output torque is changed relatively smoothly. Meanwhile, a dashed line show a case in which the ignition timing is constantly on the delay side due to the knocking control measure. When the delay control is further performed by the delay amount $SB_{dn}$ during downshifting, the turbine speed NT does not increase due to a decrease in the engine torque. When the delay control during downshifting (hereinafter, referrer to as "downshifting time delay control") is forcefully terminated by a backup timer or the like (time t5), shift shock occurs due to abrupt engagement of the one-way clutch, torque fluctuation and the like. Time $t_1$ is a time at which a command for downshifting from fourth speed to third speed is output. Time $t_2$ is a time at which actual disengagement of a frictional engagement device on a high speed side (fourth speed) is started. Time $t_3$ is a time at which the downshifting time delay control is started. Time $t_4$ is a time at which shifting during normal engine torque control ends. Time $t_5$ is a time at which the downshifting time delay control is forcefully terminated by the backup timer during delay control for knocking control measure.

SUMMARY OF THE INVENTION

The invention is made in the light of the above-mentioned circumstances. It is an object of the invention to prevent engine torque from excessively decreasing due to simultaneous execution of downshifting and delay control for preventing knocking.

In order to achieve the above-mentioned object, a torque-down control device according to an aspect of the invention includes a guard portion which restricts a predetermined delay amount of ignition timing using a guard value when ignition timing of an engine is delayed by the predetermined delay amount during downshifting of a transmission such that engine torque is temporarily decreased, and a learning portion which corrects the guard value based on a change in a rotational speed (hereinafter, referred to as a "rotational speed change") of a rotating member whose rotational speed changes due to the downshifting.

In the torque-down control device according to the above-mentioned aspect of the invention, since the entire delay amount of the ignition timing is restricted using the guard value, an excessive decrease in the engine torque due to simultaneous execution of downshifting and delay control for preventing knocking is prevented. Also, shift shock due to abrupt engagement of a one-way clutch and torque fluctuation is suppressed, and acceleration performance is enhanced. The guard value of the entire delay amount is corrected based on the rotational speed change (the change in an input rotational speed) of the rotating member whose rotational speed changes due to downshifting. Accordingly, an appropriate shifting characteristic is maintained regardless of individual differences of the engine, the transmission and the like, and change with time, and the above-mentioned effect can be obtained constantly.

A downshifting time torque-down control device according to another aspect of the invention includes a feedback control portion which performs feedback control of a predetermined delay amount based on a rotational speed change of a rotating member whose rotational speed changes when ignition timing of an engine is delayed by the predetermined delay amount during downshifting of a transmission such that engine torque is temporarily decreased.

In the torque-down control device according to the above-mentioned aspect, the feedback control of the entire delay amount of the ignition timing is performed based on the rotational speed change of the rotating member whose rotational speed changes due to downshifting of the transmission. Accordingly, an excessive decrease in the engine torque due to simultaneous execution of downshifting and delay control for preventing knocking is prevented. Also, shift shock due to abrupt engagement of a one-way clutch and torque fluctuation is suppressed and acceleration performance is enhanced. In addition, the feedback control of the entire delay amount is performed based on the actual rotational speed change. Accordingly, an appropriate shifting characteristic can be obtained regardless of individual differences of the engine, the transmission and the like, and change with time, and the above-mentioned effect can be obtained constantly.

A downshifting time torque-down control device according to another aspect of the invention includes a guard portion which restricts a predetermined delay amount of ignition timing using a guard value when the ignition timing of an engine is delayed by the predetermined delay amount during downshifting of a transmission such that engine torque is temporarily decreased, a feedback control portion which performs the feedback control of the predetermined delay amount based on the rotational speed change of the rotating member when the rotational speed change of a rotating member whose rotational speed changes due to the downshifting falls out of a predetermined allowable range, and a learning portion which corrects the guard value based on a feedback correction amount by the feedback control portion.

In the torque-down control device according to the above-mentioned aspect, the entire delay amount of the ignition timing is restricted using the guard value. Also, when the rotational speed change of the rotating member whose rotational speed changes due to downshifting falls out of the predetermined allowable range, the feedback control of the entire delay amount of the ignition timing is performed based on the rotational speed change. Accordingly, an excessive decrease in the engine torque due to simultaneous execution of downshifting and the delay control for preventing knocking is prevented, and shift shock due to abrupt engagement of the one-way clutch and torque fluctuation is suppressed and acceleration performance is enhanced. Further, the feedback control is performed based on the actual rotational speed change, and the guard value of the entire delay amount is corrected based on the feedback correction amount. Accordingly, an appropriate shifting characteristic can be obtained regardless of individual differences of the engine, the transmission and the like, and change with time, and the above-mentioned effect can be obtained constantly.

DETAILED DESCRIPTION OF THE PREFERRED ASPECTS

Figure 1:
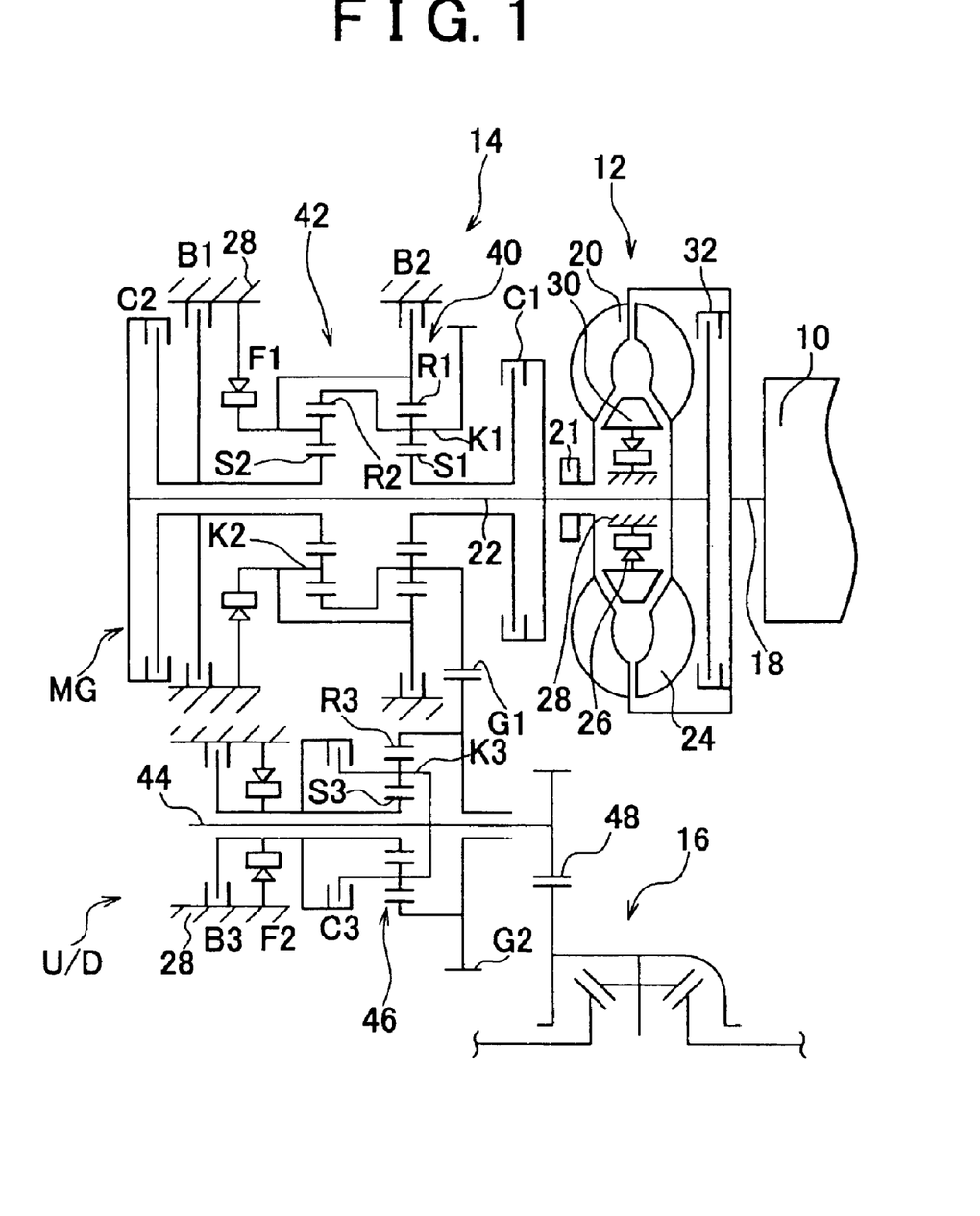
FIG. 1 is a schematic diagram showing a driving device for a vehicle to which the invention is applied.

Hereafter, an embodiment of the invention will be described with reference to accompanying drawings. FIG. 1 is a schematic diagram of a driving device for a vehicle provided with a transversely-mounted type engine, such as an FF (front engine front drive) vehicle. An output from an engine 10, such as a gasoline engine which generates power by fuel combustion, is transmitted to a drive wheel (not shown) via a torque converter 12, an automatic transmission 14, and a differential gear 16. The torque converter 12 includes a pump impeller 20 which is coupled with a crank shaft 18 of the engine 10, a turbine runner 24 which is coupled with an input shaft 22 of the automatic transmission 14, a stator 30 which is fixed to a housing 28, that is a non-rotating member, via a one-way clutch 26, and a lockup clutch 32 which directly couples the crank shaft 18 with the input shaft 22. The lockup clutch 32 is a hydraulic frictional engagement device which is frictionally engaged using a pressure difference in fluid between an engagement side oil chamber and a disengagement side oil chamber. A mechanical oil pump 21 such as a gear pump is coupled with the pump impeller 20, and is rotationally-driven with the pump impeller 20 by the engine 10 so as to generate a hydraulic pressure for shifting and lubrication. The engine 10 is a driving power source for running, and the torque converter 12 is a fluid type power transmission device.

The automatic transmission 14 includes a pair of a first planetary gear device 40 and a second planetary gear device 42 of a single pinion type, which is provided coaxially on the input shaft 22 and which forms a so-called CR—CR coupling planetary gear mechanism when a carrier and a ring gear are coupled with each other, a set of third planetary gear device 46 which is provided coaxially on a counter shaft 44 that is parallel to the input shaft 22, and an output gear 48 which is fixed at an end of the counter shaft 44 and is engaged with a ring gear of the differential gear 16. The components of each of the planetary gear devices 40, 42, 46, that is, a sun gear, a ring gear, and a carrier, which rotatably supports planetary gears that are engaged with the sun gear and the ring gear, are selectively coupled with each other or with the input shaft 22 by the three clutches C1, C2 C3, and selectively coupled with the housing 28, which is a non-rotating member, by the three brakes B1, B2, B3. Also, the sun gear, the ring gear and the carrier are engaged with the housing 28 depending on a rotation direction thereof by the two one-way clutches F1, F2. Since the differential gear 16 is formed so as to be symmetric with respect to an axis line, the lower portion is omitted in the figure.

A main shifting portion MG having forward three speeds and reverse one speed is provided with a pair of the first planetary gear device 40 and a second planetary gear device 42, the clutches C1, C2, the brakes B1, B2, and the one-way clutch F1 which are provided coaxially on the input shaft 22. A sub shifting portion, that is, an under drive portion U/D is provide with a set of planetary gear device 46, the clutch C3, the brake B3 and the one-way clutch F2 which are provided on the counter shaft 44. In the main shifting portion MG, the input shaft 22 is coupled with a sun gear S1 of the first planetary gear device 40 via the clutch C1, and a sun gear S2 of the second planetary gear device 42 via the clutch C2. A ring gear R1 of the first planetary gear device 40 and a carrier K2 of the second planetary gear device 42 are coupled with each other. A ring gear R1 of the first planetary gear device 40 and a carrier K2 of the second planetary gear device 42 are coupled with each other. The ring gear R1 of the first planetary gear device 40 and the carrier K2 of the second planetary gear device 42 are coupled with the housing 28, that is a non-rotating member, via the second brake B2. The sun gear S2 of the second planetary gear device 42 is coupled with the housing 28, which is a non-rotating member, via the first brake B1. The one-way clutch F1 is provided between the ring gear R1 and the carrier K2, and the housing 28, that is a non-rotating member. A first counter gear G1 which is fixed to the carrier K1 of the first planetary gear device 40 is engaged with a second counter gear G2 which is fixed to the ring gear R3 of the third planetary gear device 46, such that power is transmitted between the main shifting portion MG and the under drive portion U/D. In the under drive portion U/D, the carrier K3 and the sun gear S3 of the third planetary gear device 46 are coupled with each other via the third clutch C3, and the third brake B3 and the one-way clutch F2 are provided in parallel between the sun gear S3 and the housing 28, which is a rotating member.

Figure 2:
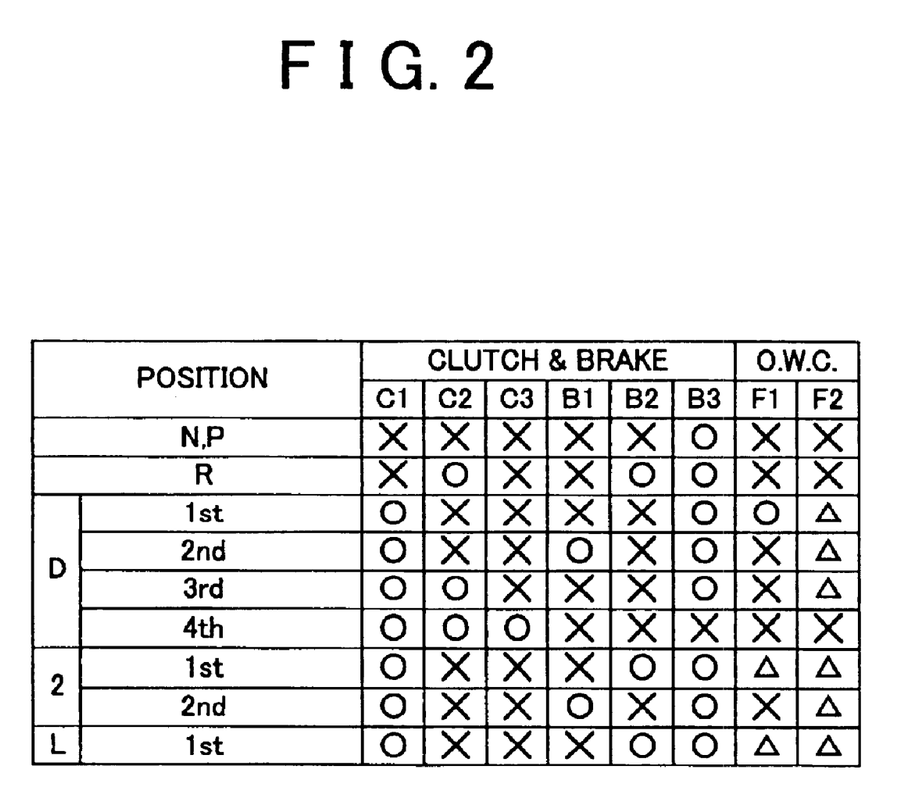
FIG. 2 is a table explaining engagement/disengagement states of clutches and brakes for realizing various shift speeds of the automatic transmission in FIG. 1.

The clutches C1, C2, C3 and the brakes B1, B2, B3 (hereinafter, simply referred to as the clutch C and the brake B unless they need to be distinguished from each other) are hydraulic frictional engagement devices, such as multi disc clutches and brakes whose engagement/disengagement is controlled by a hydraulic actuator. The engagement/disengagement states of the clutches and brakes are changed when the hydraulic circuit is switched by excitation/non-excitation of a linear solenoid valve and a solenoid valve of a hydraulic control circuit 98 (refer to FIG. 3), a manual valve (not shown) or the like, as shown in FIG. 2. The forward four speeds and the reverse one speed, and neutral are realized according to a position of a shift lever 72 (refer to FIG. 3). In FIG. 2, "$1^{st}$" to "$4^{th}$" signify plural forward shift speeds whose gear ratios are different from each other. A circle signifies engagement, an X signifies disengagement, and a triangle signifies engagement which is not related to power transmission. The shift lever 72 is operated so as to be in one of a parking position "P", a reverse running position "R", a neutral position "N", forward running positions "D", "2", "L". In the positions "P" and "N", neutral is realized in which power transmission is interrupted. In the first shift speed "$1^{st}$" in the position "D", an engine brake does not operate by the action of the one-way clutch F1. However, in first speed "$1^{st}$" in the position "2" and the position "L", the engine brake operates due to engagement of the second brake B2.

Figure 3:
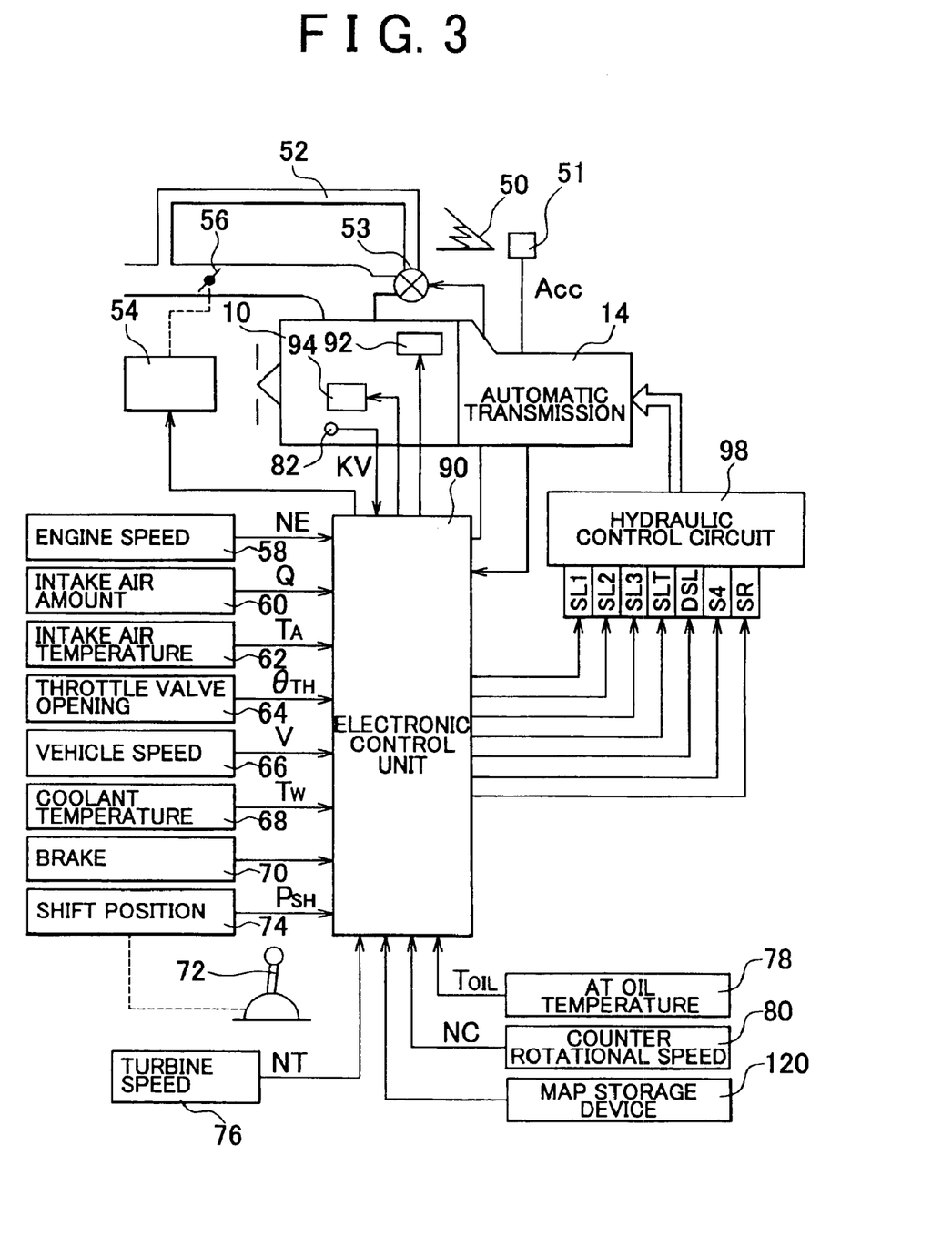
FIG. 3 is a block diagram showing a control system for performing engine control and shifting control of the driving device for a vehicle in FIG. 1.

FIG. 3 is a block diagram explaining a control system provided in the vehicle, for controlling the engine 10 and the automatic transmission 14 in FIG. 1. An operation amount Acc of an accelerator pedal 50 (hereinafter, referred to as an "accelerator pedal operation amount Acc") is detected by an accelerator operation amount sensor 51. The accelerator pedal 50 is depressed according to an output amount required by a driver, and corresponds to an accelerator operation member. The accelerator pedal operation amount Acc corresponds to a required output amount. In an intake pipe of the engine 10, an electronic throttle valve 56 whose opening is made to be an opening $\theta_{TH}$ corresponding to the accelerator pedal operation amount Acc by a throttle actuator 54. In a bypass passage 52 which bypasses the electronic throttle valve 56 for idle speed control, an ISC (idle speed control) valve 53 is provided which controls an intake air amount when the electronic throttle valve 56 is fully closed, in order to control the idle speed $NE_{IDL}$ of the engine 10. In addition, there are provided an engine speed sensor 58 for detecting the speed NE of the engine 10, an intake air amount sensor 60 for detecting an intake air amount Q of the engine 10, an intake air temperature sensor 62 for detecting a temperature $T_A$ of the intake air, a throttle sensor 64 with an idle switch for detecting a fully closed state (an idle state) of the throttle valve 56 and the opening $\theta_{TH}$ thereof, a vehicle speed sensor 66 for detecting a rotational speed $N_{OUT}$ of the counter shaft 44 corresponding to a vehicle speed V, a coolant temperature sensor 68 for detecting a coolant temperature $T_W$ of the engine 10, a brake switch 70 for detecting an operation of a brake, a shift position sensor 74 for detecting a shift position (an operation position) $P_{SH}$ of the shift lever 72, a turbine speed sensor 76 for detecting a turbine speed NT (=a rotational speed $N_{IN}$ of the input shaft 22), an AT oil temperature sensor 78 for detecting an AT oil temperature $T_{OIL}$, which is a temperature of operating oil in the hydraulic control circuit 98), a counter rotational speed sensor 80 for detecting a rotational speed NC of the first counter gear G1, a knock sensor 82 provided in a cylinder block and the like of the engine 10, for detecting a knocking vibration KV, and the like. Signals indicative of an engine speed NE, an intake air amount Q, an intake air temperature TA, a throttle valve opening θTH, a vehicle speed V, an engine coolant temperature TW, an operation state BK of the brake, a shift position PSH of the shift lever 72, a turbine speed NT, an AT oil temperature TOIL, a counter rotational speed NC, a knocking vibration KV, and the like are supplied to an electronic control unit 90.

The electronic control unit 90 is provided with a so-called microcomputer including a CPU, RAM, ROM, input/output interface and the like. The CPU performs signal process according to a program stored in the ROM in advance while using a temporary storage function of the RAM so as to perform output control of the engine 10, and shifting control of the transmission 14. The CPU may be configured separately for the engine control and for the transmission control. In the output control of the engine 10, opening/closing of the electronic throttle valve 56 is controlled by the throttle actuator 54, a fuel injection valve 92 is controlled for fuel injection amount control, a ignition device 94 such as an igniter is controlled for ignition timing control, and the ISC valve 53 is controlled for idle speed control. In shifting control of the automatic transmission 14, a shift speed of the automatic transmission 14 is decided based on the actual throttle opening $\theta_{TH}$ and the vehicle speed V according to a pre-stored shift map (shift condition) which. In order to realize the decided shift speed, the solenoid valve of the hydraulic control circuit 98 is switched between ON (excitation) and OFF (non-excitation), and an excitation state of the linear solenoid valve is continuously changed by duty control etc.

Figure 4:
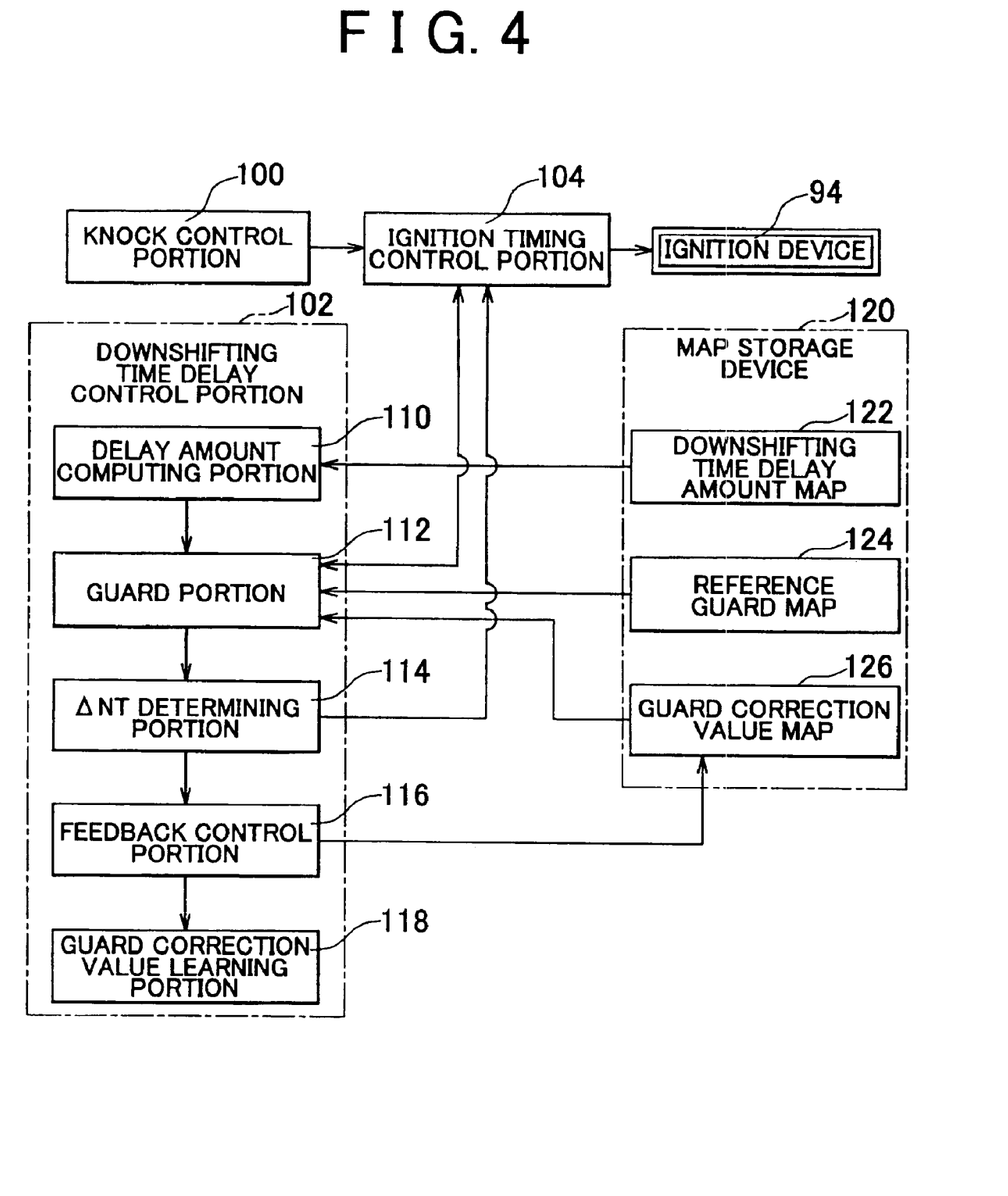
FIG. 4 is a block diagram showing functions related to ignition timing control of the engine in the driving device for a vehicle in FIG. 1.

The electronic control unit 90 performs delay control of the ignition timing in order to prevent knocking and shift shock during downshifting. As shown in FIG. 4, the electronic control unit 90 includes a knock control portion 100, a downshifting time delay control portion 102, and an igniting timing control portion 104. The knock control portion 100 detects knocking based on knocking vibration KV supplied from the knock sensor 82, and performs delay control of the ignition timing of the ignition device 94 via the ignition timing control portion 104, in order to prevent knocking due to use of an undesignated type of fuel.

Figure 5:
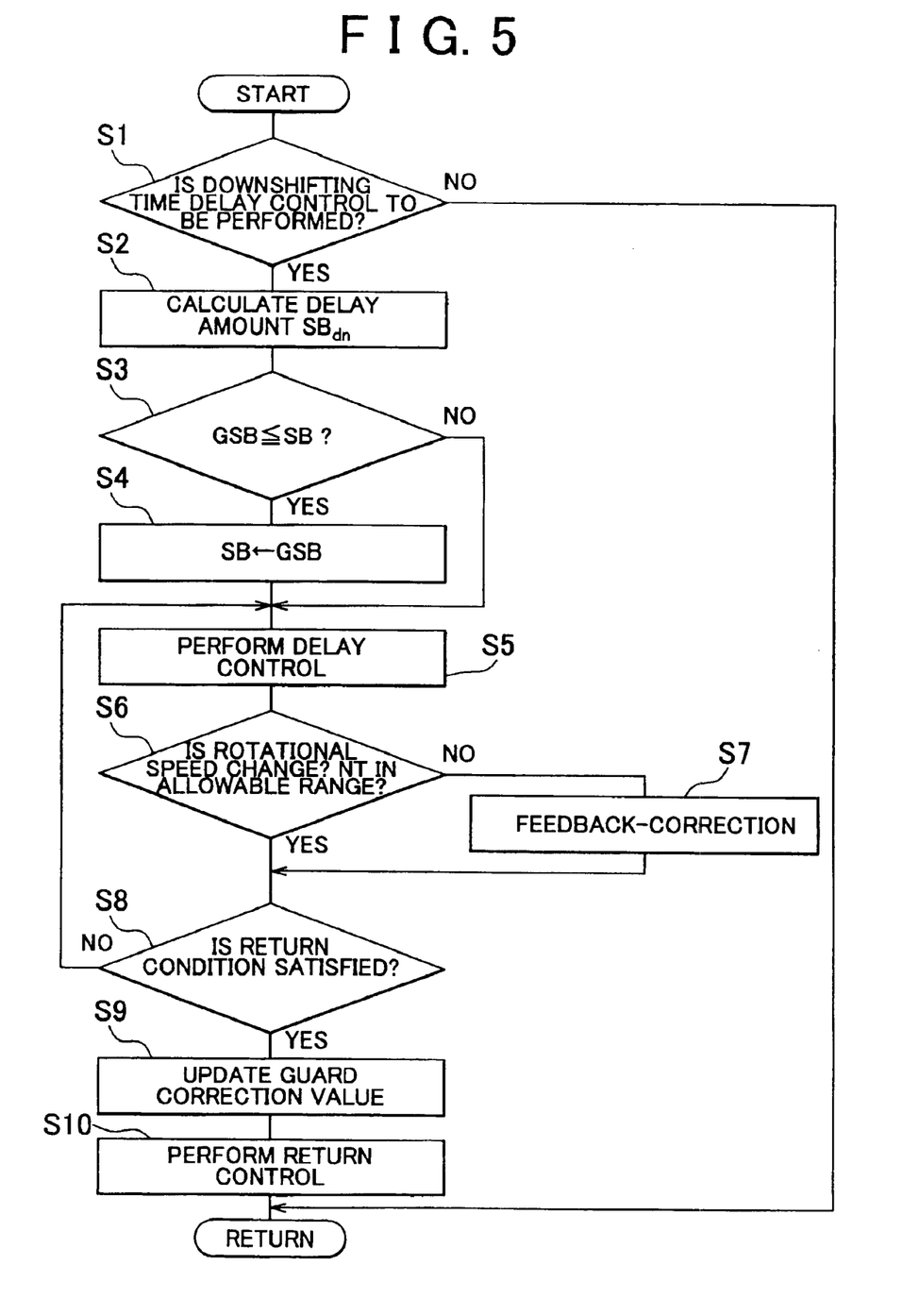
FIG. 5 shows a flowchart concretely explaining process performed by a downshifting time delay control portion in FIG. 4.
Figure 6:
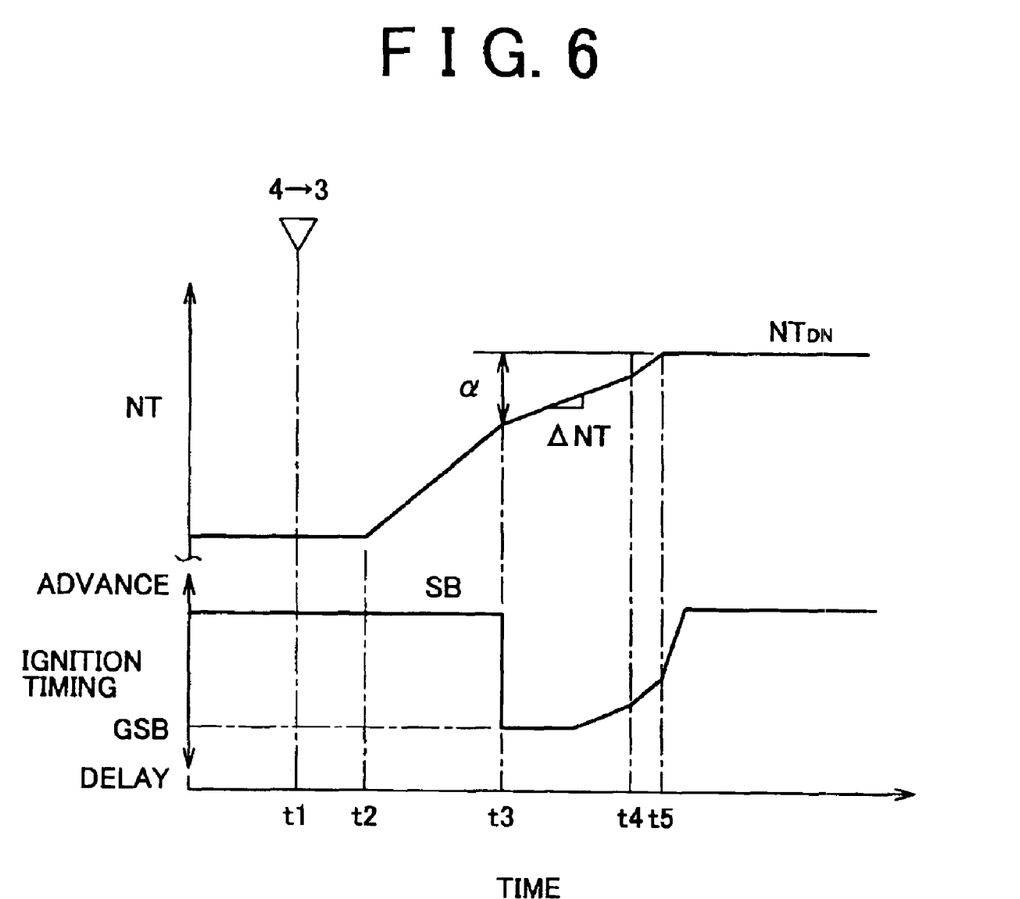
FIG. 6 shows an example of a time chart when downshifting time delay control is performed according to the flowchart in FIG. 5 during delay control performed by a knock control portion in FIG. 4.

The downshifting time delay control portion 102 performs delay control of the ignition timing so as to temporarily decrease the engine torque, in order to prevent shift shock from occurring when the rotational speed (the turbine speed NT) of the input shaft 22 increases during downshifting of the automatic transmission 14 and reaches the synchronous rotational speed N TDN after shifting. The downshifting time delay control portion 102 functionally includes a delay amount computing portion 110, a guard portion 112, a ΔNT determining portion 114, a feedback control portion 116, and a guard correction value learning portion 118. The downshifting time delay control portion 102 performs signal process according to the flowchart in FIG. 5 using a downshifting time delay amount map 122 stored in a map storage device 120, a reference guard value map 124, a guard correction value map 126 and the like. FIG. 6 shows an example of a time chart showing changes of the turbine speed NT and the ignition timing when a command for downshifting from fourth speed to third speed for engaging the one-way clutch F2 is output while delay control by the knock control portion 100 is being performed, and downshifting time delay control is performed according to the flowchart in FIG. 5. In FIG. 5, step S2 is performed by the delay amount computing portion 110, steps S3, S4 are performed by the guard portion 112, step S6 is performed by the ΔNT determining portion 114, step S7 is performed by the feedback control portion 116, and step S9 is performed by the guard correction value learning portion 118. The guard correction value learning portion 118 corresponds to a learning portion.

In Step S1 in FIG. 5, it is determined whether delay control (torque-down control) during downshifting (hereinafter, referred to as "downshifting time delay control") is performed, more particularly, whether a command for downshifting is output while the accelerator pedal is being depressed, that is, while power is ON. When it is determined that the command for downshifting is output while power is ON, step S2 and the following steps are performed. Time $t_1$ in FIG. 6 is a time at which the command for downshifting from fourth speed to third speed is output while power is ON. In step S2, a delay amount $SB_{dn}$ for downshifting time delay control is calculated using the downshifting time delay amount map 122 which is stored in the map storage device 120. The downshifting time delay amount map 122 stores the preset delay amount $SB_{dn}$ using the operation state such as the throttle valve opening $\theta_{TH}$, the engine speed NE, types of downshifting as parameters, in order to perform downshifting as smoothly as possible while preventing shift shock, and calculates the delay amount $SB_{dn}$ corresponding to the present operation state using a map or the like in step S2.

In Step S3, the present delay control information is obtained from the ignition timing control portion 104 and an entire delay amount SB including the above-mentioned delay amount $SB_{dn}$ is obtained, and a reference guard value GSB1 of the reference guard value map 124 and a guard correction value GSB2 of the guard correction value map 126 are added to each other such that a guard value GSB is calculated. Then, it is determined whether the entire delay amount SB is equal to or larger than the guard value GSB. The reference guard value map 124 stores the reference guard value GSB1 and the guard correction value map 126 stores the guard correction value GSB2, using operation states such as the throttle valve opening $\theta_{TH}$, the engine speed NE, types of downshifting as parameters. The reference guard value GSB1 is set in advance such that torque of the engine 10 does not excessively decrease. Meanwhile, the guard correction value GSB2 is rewritten and updated as required in step S9. When GSB is equal to or smaller than SB, since the engine torque may excessively decrease, the guard value GSB is made to be equal to the entire delay amount SB in step S4.

In Step S5, a command for performing delay control is output to the ignition timing control portion 10 such that delay control of the ignition timing is performed by the entire delay amount SB (equal to or smaller than SGB) at a predetermined timing, and the ignition timing control portion 104 performs delay control of the ignition timing by the entire delay amount SB according to the command. The delay control is started at a time at which the turbine speed NT has reached a rotational speed which is lower than the synchronous rotational speed $NT_{DN}$ after downshifting by a predetermined amount a, for example, at time t3 in FIG. 6. FIG. 6 shows a case in which the delay control by the knock control portion 100 is being performed and the entire delay amount SB of the ignition timing is guarded by the guard value GSB. Time t2 in FIG. 6 is a time at which engagement of the frictional engagement device (the clutch C3) on the high speed side (fourth speed) is started according to the command for downshifting from fourth speed to third speed.

In step S6, it is determined whether a rotational speed change ΔNT of the turbine speed NT during delay control at the time of downshifting is within an allowable range which is set in advance such that downshifting is completed as promptly as possible while shift shock. In the embodiment, whether the rotational speed change ΔNT is within the allowable range is determined according to whether the rotational speed change ΔNT is between an upper limit and a lower limit, which are set in advance. However, in terms of preventing an excessive decrease in the engine torque, only whether the rotational speed change ΔNT is larger than the predetermined lower limit may be determined. The upper limit and the lower limit of the allowable range may be set to fixed values. However, the allowable range may be set using the operation states such as the types of downshifting, the turbine speed NT, the vehicle speed V, the accelerator operation amount Acc and a speed Δacc at which the accelerator operation amount changes as parameters.

When the rotational speed change ΔNT is within the allowable range, step S8 is immediately performed. When the rotational speed change ΔNT is not in the allowable range, step S7 is performed. After the entire delay amount SB is feedback-corrected such that the rotational speed change ΔNT is equal to a target rotational speed change ΔNTT, step S8 is performed. For example, when a fixed value in the allowable range in step S6 is decided, and the allowable range is set using the operation states such as the types of downshifting, the turbine speed NT as parameters, the target rotational speed change ΔNTT is also set using the operation states as parameters. The rotational speed change ΔNT is a rotational speed change of the rotating member whose rotational speed changes due to downshifting. The input shaft 22 which rotates at the turbine speed NT corresponds to the rotating member. In terms of downshifting from fourth speed to third speed, control in step S6, S7 can be performed using a rotational speed change of the counter rotational speed NC.

A return condition is step S8 is a condition that the turbine speed NT reaches a rotational speed which is slightly lower than the synchronous rotational speed $NT_{DN}$ after downshifting, as time t4 in FIG. 6. Step S5 and the previous steps are repeated until the return condition is satisfied. When the return condition is satisfied, the guard correction value GSB2 is rewritten and updated as required in step S9, after which the return control is performed in step S10. The guard correction value GSB2 is updated, for example, by increasing or decreasing the guard correction value GSB2 of the guard correction value map 126 by the greatest value of the feedback correction amount, when the feedback correction is performed in step S7. Thus, in the next downshifting time delay control, the entire delay amount SB is restricted using the guard value GSB which is obtained using the new guard correction value GSB2. When the learning correction of the guard value GSB is repeated as required, the rotational speed change ΔNT of the turbine speed NT during delay control at the time of downshifting falls within the allowable range.

In the return control in step S10, the entire delay amount SB at the ignition timing is gradually decreased such that the engine torque is increased gradually. When the turbine speed NT reaches the synchronous rotational speed $NT_{DN}$ after downshifting, that is, when downshifting is completed, the downshifting time delay control is terminated and the entire delay amount SB is returned to an initial value (downshifting time delay amount $SB_{dn}$=0) promptly. FIG. 6 shows a case in which downshifting time delay control is performed while the feedback correction in step S7 is performed. Time $t_4$ is a time at which the return condition is satisfied and the return control in step S8 is started. Time $t_5$ is a time at which the turbine speed NT reaches the synchronous rotational speed NTDN after downshifting and downshifting is completed.

In the downshifting time delay control according to the embodiment, the entire delay amount SB of the ignition timing is restricted using the guard value GSB, and when the rotational speed change ΔNT of the turbine speed NT at the delay restriction time falls outside the predetermined allowable range, the feedback control of the entire delay amount SB is performed such that the rotational speed change ΔNT is equal to the target rotational speed change ΔNTT. Accordingly, even downshifting is performed simultaneously with the delay control by the knock control portion 100, the engine torque is prevented from excessively decreasing. Thus, the situation is prevented from occurring, for example, as shown by the dashed line in FIG. 9, when the engine torque excessively decreases and a progress of downshifting becomes slow, and when the downshifting time delay control is forcefully terminated by the backup timer or the like, shift shock occurs due to torque fluctuation caused by abrupt engagement of the one-way clutch F2. In addition, downshifting promptly proceeds and acceleration performance is enhanced.

Also, the feedback control of the entire delay amount SB is performed based on the actual rotational speed change ΔNT, and the guard correction value GSB2 of the entire delay amount SB is updated based on the feed back correction amount, and the guard value GSB is learned and corrected. Accordingly, an appropriate shifting characteristic can be obtained regardless of the individual differences of the engine 10, the automatic transmission 14 and the like, and change with time, and the above-mentioned effect can be constantly obtained.

In the above-mentioned embodiment, the entire delay amount SB is restricted using the guard value GSB, and the feedback control is performed. However, as shown in FIG. 7, the feedback control can be omitted, or as shown in FIG. 8, the restriction by the guard value GSB can be omitted.

Figure 7:
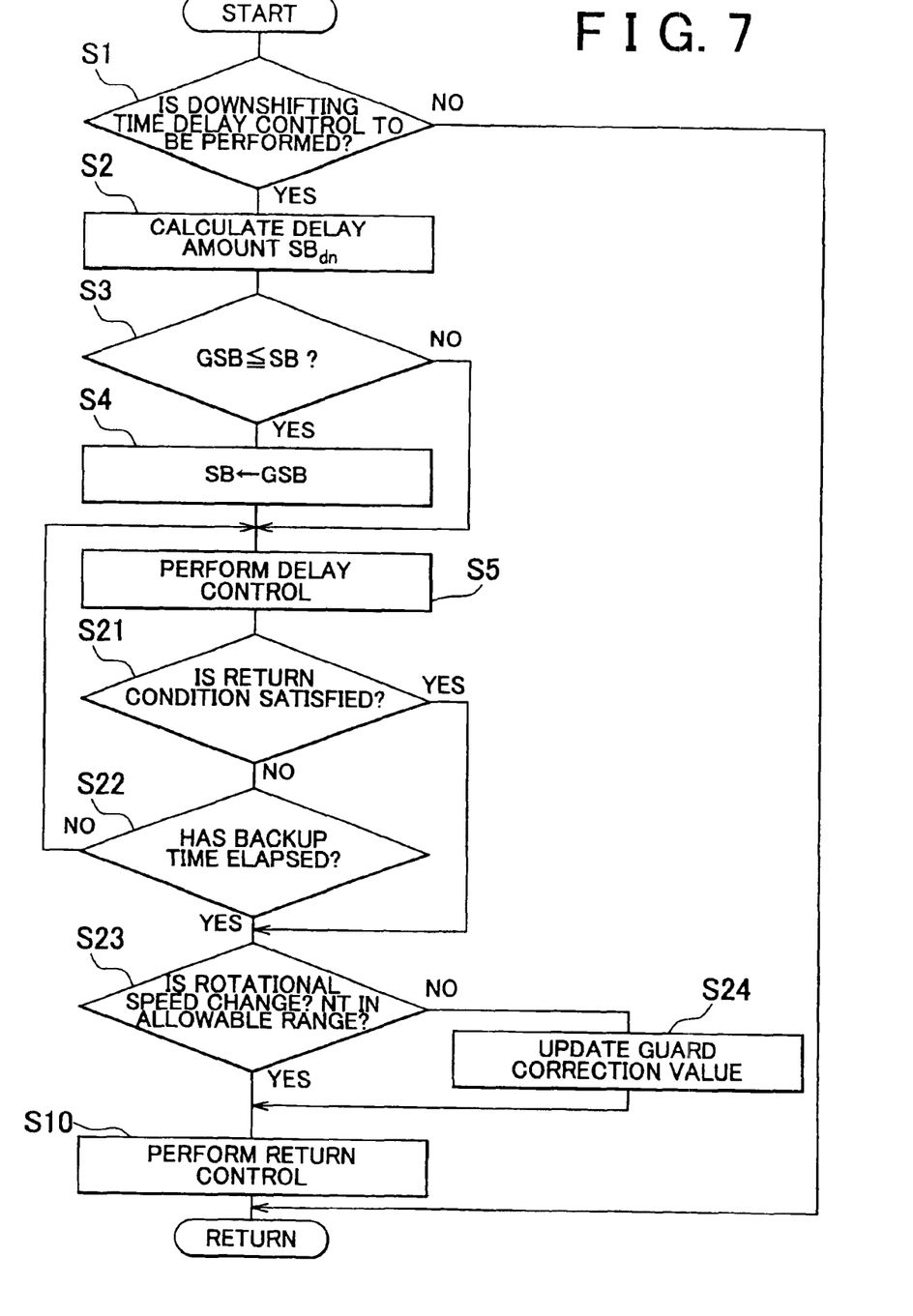
FIG. 7 shows a flowchart explaining another embodiment of the invention, and corresponds to FIG. 5.

In FIG. 7, after a command for performing the downshifting time delay control, it is determined in step S21 whether the return condition is satisfied in the same manner as step S8, and it is determined in step S22 whether the predetermined backup time has elapsed. The downshifting time delay control is performed until an affirmative determination is made in one of step 21 and step 22. Then, when an affirmative determination is made in step S21 or S22, step S23 is performed, and it is determined whether the rotational speed change ΔNT of the turbine speed NT during downshifting time delay control is within the allowable range. When a negative determination is made, the guard correction value GSB2 in the guard correction value map is increased or decreased so as to be corrected, for example, by multiplying a deviation in the allowable range by a predetermined coefficient in step S24. Thus, in the next downshifting time delay control, the entire delay amount SB is restricted using the guard value GSB which is obtained using the new guard correction value GSB2, and the learning correction of the guard value GSB is repeated as required. Accordingly, the rotational speed change ΔNT of the turbine speed NT during downshifting time delay control falls with in the allowable range.

In this case, since the entire delay amount SB at the ignition timing is restricted using the guard value GSB, even when downshifting is performed simultaneously with the delay control by the knock control portion 100, the engine torque is prevented from excessively decreasing, an occurrence of shift shock is prevented as well as in the embodiment, downshifting promptly proceeds, and the acceleration performance is enhanced. Also, since the guard correction value GSB2 of the entire delay amount SB is learned and corrected based on the actual rotational speed change ΔNT, an appropriate shifting characteristic can be obtained regardless of the individual differences of the engine 10, the automatic transmission 14 and the like, and the above-mentioned effect can be obtained constantly.

Figure 8:
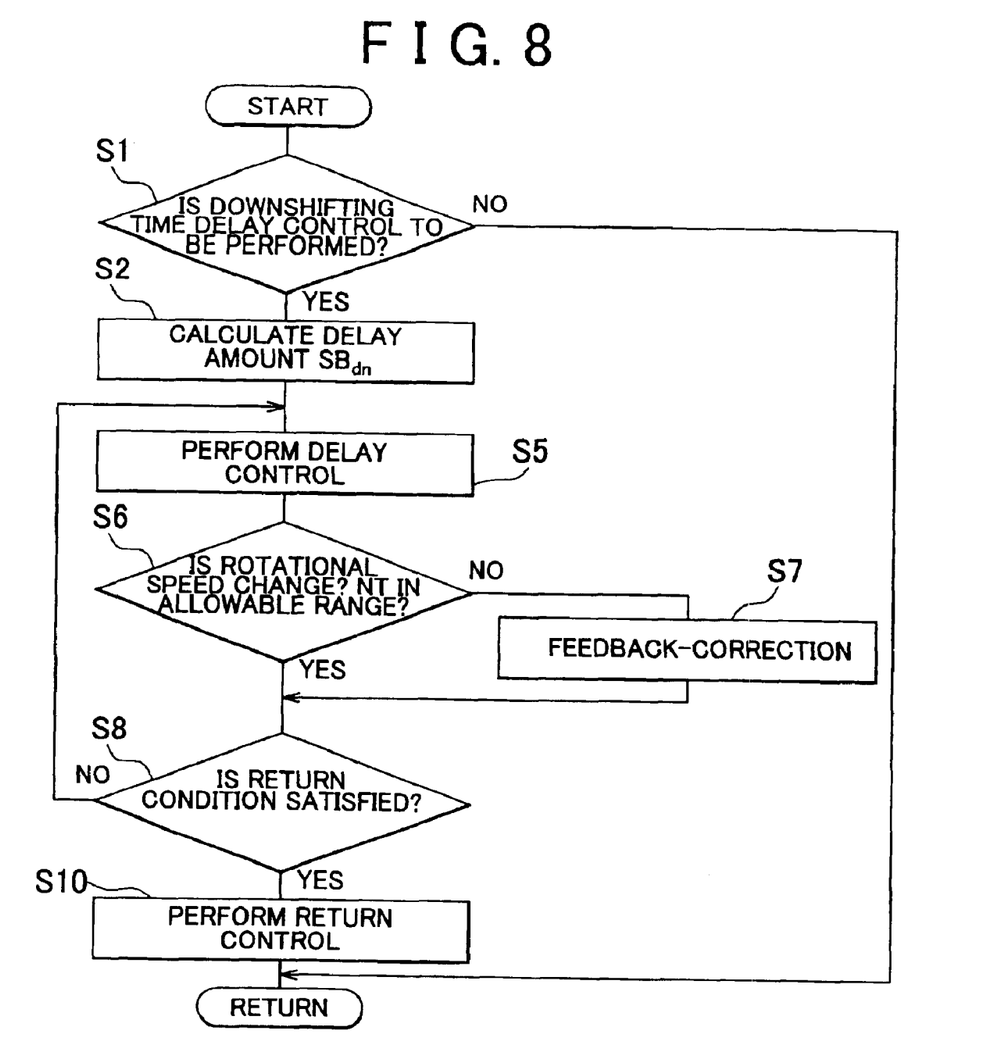
FIG. 8 shows a flowchart explaining another embodiment of the embodiment, and corresponds to FIG. 5.

Compared with FIG. 5, in FIG. 8, steps S3, S4, S9 which are related to the guard value GSB are omitted. The downshifting time delay control is performed in step S5 without restricting the entire delay amount by the guard value GSB. When the rotational speed change ΔNT of the turbine speed NT deviates from the allowable range during the downshifting time delay control, the entire delay amount SB is feedback-corrected such that the rotational speed change ΔNT is equal to the predetermined target rotational speed change ΔNTT in step S7.

In this case, when the rotational speed change ΔNT of the turbine speed NY during the delay control falls outside the predetermined allowable range, the feedback control of the entire delay amount SB is performed such that the rotational speed change ΔNT is equal to the target rotational speed change ΔNTT. Accordingly, even when downshifting is performed simultaneously with the delay control by the knock control portion 100, the engine torque is prevented from excessively decreasing, an occurrence of the shift shock is prevented as well as in the embodiment, downshifting promptly proceeds, and the acceleration performance is enhanced. Also, since the feedback control of the entire delay amount SB is performed based on the actual rotational speed change ΔNT, an appropriate shifting characteristic can be obtained regardless of the individual differences of the engine 10, the automatic transmission 14 and the like and change with time, and the above-mentioned effect can be obtained constantly.

While the invention has been described in detail with reference to the accompanying drawing, it will be apparent to those skilled in the art that the invention is not limited to the above-mentioned embodiment, and that the invention may be realized in various other embodiments within the scope of the invention.

The invention is preferable applied to a vehicle including a delay control portion which performs delay control of the ignition timing even at times other than the torque-down control during downshifting, such as a knock control portion which prevents knocking by delay control.

As a transmission, multi-stage automatic transmissions are preferable employed, such as a planetary gear type which engages/disengages rotational elements of plural planetary gear devices using a clutch or the like so as to realize plural shift speeds, and a two shaft engagement type which moves a clutch hub sleeve so as to realize plural shift speeds. However, a continuously variable automatic transmission of a belt type or the like can be employed. Also, various types of transmission can be employed such as a transmission in which the shift speed is automatically changed according to operation states such as a vehicle speed, a throttle valve opening and an accelerator operation amount, and a transmission in which the shift speed is changed according to switch operation performed by a driver.

A delay amount during downshifting may be set to a fixed value in advance. However, it is preferable that the delay amount during downshifting be set using engine operation states such as a throttle opening, and an engine speed, and types of downshifting as parameters.

A rotating member whose rotational speed changes due to downshifting may be, for example, an input shaft of the transmission, a turbine shaft of a torque converter, a crank shaft of the engine or the like, or may be a rotating member inside the transmission.

Also, a guard value is corrected by a feedback correction amount, or the guard value is corrected by a value obtained by multiplying the correction amount by a predetermined coefficient. However, various configuration may be adopted, for example, a configuration in which the guard value is corrected according to deviation between a rotational speed change and a target rotational speed change of a rotating member, and a configuration in which the guard value is increased or decreased by a predetermined fixed amount regardless of the deviation.

It is preferable that the guard value of the entire delay amount and the guard correction value by a learning portion store the engine operation state such as the throttle valve opening and the engine speed, or the operation state such as the types of downshifting as parameters. However, a fixed value may be used regardless of the engine operation state and the types of downshifting.

It is preferable that the feedback control portion be configured so as to perform the feedback control of the entire delay amount such that the actual rotational speed change is equal to the target rotational speed change, and the target rotational speed change is set using the operation states such as the types of downshifting, the rotational speed of the rotating member, the vehicle speed, the accelerator operation amount, the speed at which the accelerator operation amount changes as parameters, in consideration of shift shock and responsiveness. The target rotational speed change may be fixed. However, the target rotational speed change may be set so as to change as downshifting proceeds.

What is claimed is:

1. A torque-down control device, comprising:
    a guard portion which restricts a predetermined delay amount of ignition timing using a guard value when ignition timing of an engine is delayed by the predetermined delay amount during downshifting of a transmission such that engine torque is temporarily decreased, and
    a learning portion which corrects the guard value based on a change in a rotational speed of a rotating member whose rotational speed changes due to the downshifting.

2. The torque-down control device according to claim 1, wherein, when the predetermined delay amount is on a delay side with respect to the guard value, the ignition timing during downshifting is delayed by the guard value.

3. The torque-down control device according to claim 1, wherein when the predetermined delay amount is on an advance side with respect to the guard value, the ignition timing during downshifting is delayed by the predetermined delay amount.

4. The torque-down control device according to claim 1, wherein the rotating member is a turbine of a torque converter.

5. A torque-down control device, comprising:
    a feedback control portion which performs feedback control of a predetermined delay amount based on a change in a rotational speed of a rotating member whose rotational speed changes when ignition timing of an engine is delayed by the predetermined delay amount during downshifting of a transmission such that engine torque is temporarily decreased.

6. The torque-down control device according to claim 5, wherein, when the change in the rotational speed falls outside a predetermined allowable range, the feedback control portion performs the feedback control such that the change in the rotational speed falls within the predetermined allowable range.

7. The torque-down control device according to claim 5, wherein the rotating member is a turbine of a torque converter.

8. A torque-down control device, comprising:
    a guard portion which restricts a predetermined delay amount of ignition timing using a guard value when the ignition timing of an engine is delayed by the predetermined delay amount during downshifting of a transmission such that engine torque is temporarily decreased;
    a feedback control portion which performs feedback control of the predetermined delay amount based on a change in a rotational speed of a rotating member when the change in the rotational speed of the rotating member whose rotational speed changes due to the downshifting falls outside a predetermined allowable range; and
    a learning portion which corrects the guard value based on a feedback correction amount by the feedback control portion.

9. The torque-down control device according to claim 8, wherein, when the predetermined delay amount is on a delay side with respect to the guard value, the ignition timing during downshifting is delayed by the guard value.

10. The torque-down control device according to claim 8, wherein when the predetermined delay amount is on an advance side with respect to the guard value, the ignition timing during downshifting is delayed by the predetermined delay amount.

11. The torque-down control device according to claim 8, wherein the rotating member is a turbine of a torque converter.

12. A control method by a torque-down control device, comprising the steps of:
    controlling ignition timing of an engine by setting a delay amount of the ignition timing of an engine to equal to or lower than a guard value during downshifting of a transmission, and
    correcting the guard value based on a change in a rotational speed of a rotating member whose rotational speed changes due to downshifting.

13. A control method by a torque-down control device, comprising the step of:

performing feedback control of a predetermined delay amount based on a change in a rotational speed of a rotating member whose rotational speed changes when ignition timing of an engine is delayed by the predetermined delay amount during downshifting of a transmission such that engine torque is temporarily decreased.

14. A control method by a torque-down control device, comprising the step of:

controlling ignition timing of an engine by setting a delay amount of the ignition timing of an engine to equal to or lower than a guard value during downshifting of a transmission, performing feedback control of the predetermined delay amount based on a change in a rotational speed of a rotating member when the change in the rotational speed of the rotating member whose rotational speed changes due to the downshifting falls outside a predetermined allowable range, and correcting the guard value based on a feedback correction amount in the feedback control.

* * * * *